Oct. 1, 1935. E. L. CHOTT 2,016,103
DENTAL ALIGNING AND TESTING DEVICE
Filed Sept. 1, 1933
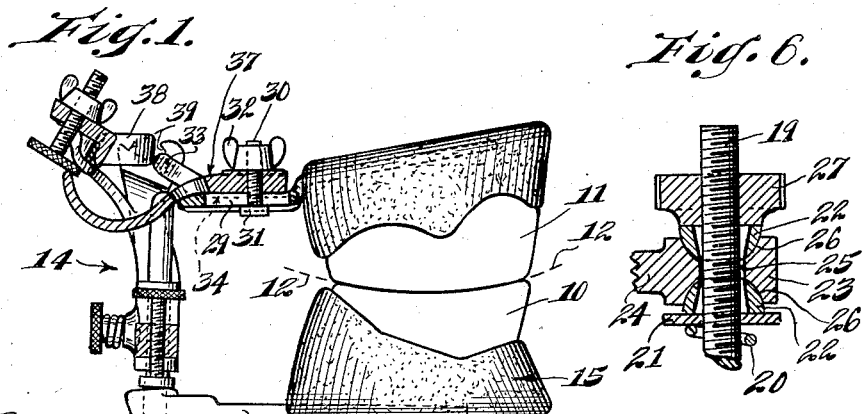
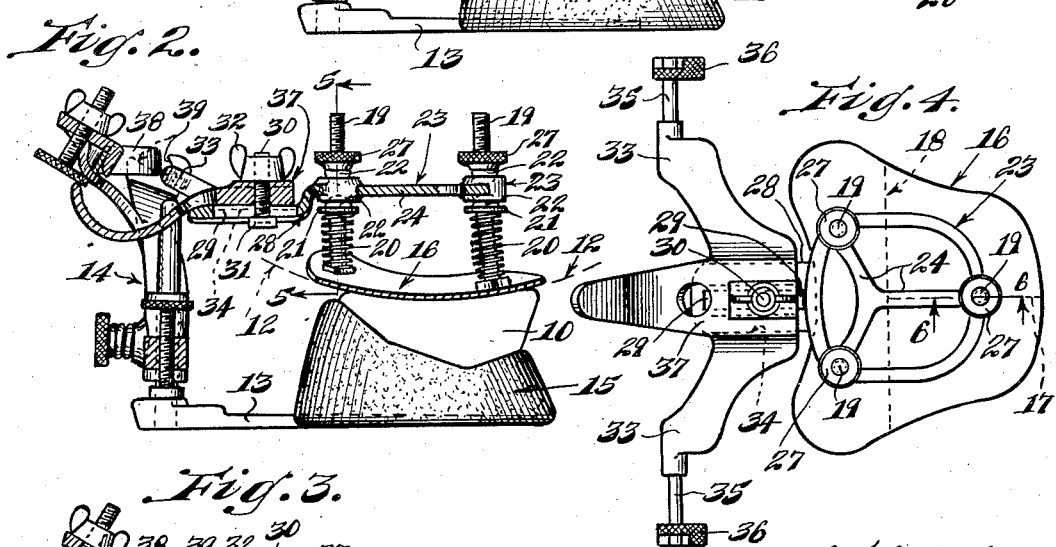
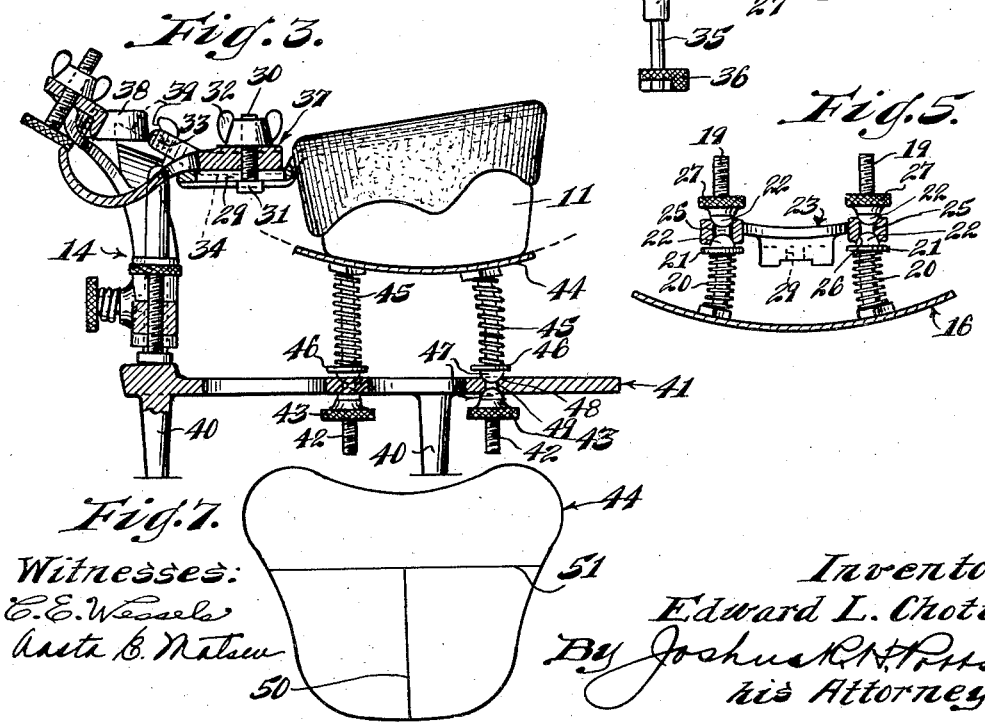
Witnesses:
C. E. Wessels
Aasta E. Matson
Inventor:
Edward L. Chott,
By Joshua R. H. Potts
his Attorney.

Patented Oct. 1, 1935

2,016,103

UNITED STATES PATENT OFFICE 2,016,103

DENTAL ALIGNING AND TESTING DEVICE

Edward L. Chott, Chicago, Ill., assignor of one-half to Hugo J. Chott, Chicago, Ill.

Application September 1, 1933, Serial No. 687,789

1 Claim. (Cl. 32—32)

My invention relates to dental aligning and testing devices, and has for an object the provision of a device which may be used for setting artificial teeth in a wax base in the proper relation to each other and testing the same before insertion in the patient's mouth in the completed article.

While the curve upon which the teeth of the human mouth are set is substantially identical in approximately 95 per cent of human bodies, there are occasional cases where there are some differences in the formation of the bone structure and muscle structure, and consequently some compensation must be made for such an individual. My device may be adapted to be used in aligning the artificial dentures for such individuals, and the denture may be tested before its insertion in the human mouth.

While various theories have been advanced, the theories of Spee and Dr. Monson have received great prominence. The theories have in common the theorem that the teeth of the human mouth are set on a curve, or the surface of a sphere. I preferably employ Dr. Monson's theory in providing my device, and make provision of a device which will set up the teeth, align them, and test them for a curve or surface taken from a sphere having a radius of 4 inches.

Heretofore articulators have been used for testing the alignment of teeth after they have been set up, and they have also been used for determining whether the alignment is such that biting and chewing movements may be made by the patient in the proper manner. I propose also to utilize the articulator frame with certain adaptations to set up the teeth, but with my device the laborious and difficult grinding operations heretofore made necessary by the improper setting of teeth without accurately testing them will be to a large extent eliminated. The grinding operations have not always been successful in producing proper final alignment, and hence the patient has had difficulty in using the artificial teeth for their intended purposes.

Other objects will appear hereinafter.

My invention may be best understood by reference to the accompanying drawing, in which:

Fig. 1 is a view, partly in elevation and partly in section, showing a type of articulator commonly in use, and having attached thereto plaster casts and wax impressions secured in said plaster casts;

Fig. 2 is a view similar to Fig. 1, with the wax impression and plaster cast for the upper set of teeth removed from the articulator, and with my aligning and testing plate attached to the articulator in the proper manner for aligning and testing;

Fig. 3 is a view similar to Fig. 2, with the lower wax impression and plaster cast removed, and with the testing plate for the upper teeth in place;

Fig. 4 is a top plan view of the testing plate shown in Fig. 2, attached to its supporting members;

Fig. 5 is a sectional view, taken substantially on the line 5—5 of Fig. 2, and shows the curvature of the testing plate;

Fig. 6 is a detail sectional view, taken substantially on the line 6—6 of Fig. 4; and Fig. 7 is a top plan view of the testing plate shown in Fig. 3.

In making a complete set of artificial teeth, it is customary to take wax impressions in the mouth of the patient, and this is shown at 10, the lower impression, and 11, the upper impression. A searing plate, not shown but well known in the art, having the curvature of the dotted line 12—12 in Fig. 1, is then applied to the top of the lower wax impression and reversed and applied to the upper wax impression 11. The purpose of this of course is to cause the two wax impressions to register on a curve indicated by the line 12—12. The lower impression 10 is then placed above the lower member 13 of an articulator, generally indicated at 14, and plaster 15 is poured around the wax impression and around the base or lower member 13 in order to provide a good foundation or support for the wax impression 10. The articulator shown is of a type generally called the Stephan articulator, and since it is well known in the art, no description of the same will be given other than to say that it has a lower member and an upper member, each of which is to support its respective wax impression.

Some dentists prefer to set up the lower set of teeth in the wax impression prior to the setting up of the upper teeth, and there are advantages urged for each of the methods. If it is desired to follow the first of these methods and set up the lower teeth first, I remove the upper member from the articulator and place in its stead the testing plate 16 shown in Fig. 4 attached to its various supporting members. Testing plate 16 has a curvature similar to that of a sphere having a 4-inch radius, and has a generally triangular shape with the apices cut away and each of the legs hollowed out. Longitudinally centrally of plate 16, I preferably place an aligning line 17, shown in dotted lines in Fig. 4, for the purpose of aligning the plate on the lower wax impression 10 with the median line placed on the wax impression by the dentist at the time the wax impression is made. A transverse aligning line 18 is placed on a plate for an analogous purpose. Attached to plate 16 are studs 19 which curve inwardly generally from their point of attachment to plate 16 and are then straightened to a substantially vertical position. Around studs 19 are placed expansion springs 20 seating against bearing washers 21, which in turn bear against the bases of hemispherically shaped bearing members 22 which are pierced to permit the passage of studs 19 therethrough. On top of members 22 is placed an open framework 23 having inwardly extending and meeting legs 24. At each point where a leg meets the outside of frame 23 a slot 25 is provided for the reception of studs 19. It will be noticed that slots 25 have enlarged and cupped ends 26 to provide bearing surfaces for bearing members 22. Bearing members similar to members 22 are provided at the upper ends of slots 25 and seat in bearing surfaces 26 which are similar to those above described. Studs 19 are externally threaded and receive knurled thumb nuts 27 for the purpose of holding frame 23 on studs 19 and bearing against the expansion of springs 20. To the rear end of frame 16 may be secured a tongue 28 having therein a longitudinal slot 29 for the reception of a bolt 30 having a head 31 and wing nut 32. Bolt 30 and wing nut 32 hold tongue 28 securely in position on swinging articulator frame 33, and may be adjusted by movement of tongue 28 in a suitably sized slot 34 in frame 33. Swinging frame 33 may be provided with laterally extending trunnions 35 having knurled heads 36.

The operation of the device is as follows: Top frame 37 of the articulator frame may be removed by pressing the trunnion heads thereof against the action of spring 38 and removing it from condyle slots 39. Swinging frame 33 may then be inserted in its place, since its dimensions and formation conform to that of upper articulator frame member 37. Proper adjustments may then be made for height, as is well known in the art, in the use of this type articulator, and knurled thumb nuts 27 may be tightened or loosened so that aligning plate 16 seats properly on lower wax impression 10 and registers perfectly therewith. The teeth may then be inserted into wax impression 10 by cutting away parts thereof, and as parts are cut away the teeth are inserted in the cutouts and aligned by the aligning plate 16. During this operation of course the entire plate and swinging frame 33 may be raised so as to be out of the way for the tooth setting operation. Successive teeth may be set by following the same procedure, and by use of aligning line 17, line 18, and adjustment of nuts 27 on studs 19. Tests of course may be made by pushing either of trunnion heads 36 backwardly and forwardly in the articulator so that trunnions 35 move backwardly and upwardly in condyle slots 39.

Dentists who prefer to set up the upper teeth first may do so by employing the structure shown in Fig. 3, which comprises an articulator frame similar to the one shown in Fig. 1 except that this one is provided with legs 40 for the purpose of raising the device above the level of lower supporting frame 41 and allowing the protrusion and extension of studs 42 which are externally threaded and provided with knurled thumb nuts 43, and are located in positions on plate 44 which are similar to those on plate 16 shown in Fig. 4. Expansion springs 45 surround studs 42 and expand in a manner similar to expansion springs 20 in bearing against washers 46, which in turn bear against bearing members 47 in bearing surfaces 48 of slots 49 in lower frame member 41. The bearing members adjacent the knurled thumb nuts are similar to bearing members 48, and bearing members 48, expansion springs 45, washers 46, bearing surfaces 48, and slots 49 are similar to like parts illustrated in Figs. 2 and 4. Studs 42 are also curved inwardly and vertically in the manner similar to studs 19 on plate 16, with the exception that they are inverted. The manner of use of the device shown in Fig. 3 is probably obvious from a description given of the device shown in Figs. 2 and 4, but of course the parts are reversed. In using plate 44 aligning line 50 is on the upper side of the plate, as is line 51 also. The upper articulator frame bearing plaster cast and wax impression 11 are removed from the articulator frame shown in Fig. 1 and placed on the frame shown in Fig. 3, and adjustments for height and longitudinal spacing are made thereafter so as to align wax impression 11 properly on plate 44. Plate 44 may be brought into proper position by loosening or tightening of knurled thumb nuts 43, as may be necessary, so as to raise or lower the plate wherever necessary. After alignment of plate 44 with the curve of wax impression 11 the teeth may be set in the impression in a manner similar to that described for setting teeth into wax impression 10, after which they may be also tested in a manner heretofore described.

It can be readily seen by one familiar with the art that much laborious and difficult labor will be eliminated by using my device, because the test will be made after each setting of each tooth, and there will be no guesswork as was always the case heretofore when an attempt was made to use an aligning plate held in the hand of the dentist. The adjustment of the thumb nuts on the studs will keep the plate in proper position at all times, and there will be no chance for slipping or error in applying the plate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

In a device of the character described employing an articulator having an upper member and a lower member, one of said members being movable toward the other, the combination of an aligning plate with one of said articulator members, means for securing said aligning plate to one of said members, said means comprising three threaded studs secured to said aligning plate at three separated points, only two of which are located on an imaginary straight line, a coil spring on each of said studs and arranged between said aligning plate and the articulator member to which said aligning plate is secured, enlarged annular apertures in said articulator member for the passage of said studs therethrough, a ball-shaped washer on each of said studs between each coil spring and said articulator member, and a thumb nut having a ball-shaped inner end threaded onto each of said studs on the side of said articulator member opposite the side against which each of said ball-shaped washers bears.

EDWARD L. CHOTT.